(12) United States Patent
Behbahani et al.

(10) Patent No.: US 8,552,902 B2
(45) Date of Patent: Oct. 8, 2013

(54) METHODS AND APPARATUS FOR SUPPRESSION OF LOW-FREQUENCY NOISE AND DRIFT IN WIRELESS SENSORS OR RECEIVERS

(75) Inventors: Farbod Behbahani, Irvine, CA (US); Vipul Jain, Irvine, CA (US)

(73) Assignee: Sabertek, Irvine, CA (US)

( * ) Notice: Subject to any disclaimer, the term of this patent is extended or adjusted under 35 U.S.C. 154(b) by 0 days.

(21) Appl. No.: 13/461,690

(22) Filed: May 1, 2012

(65) Prior Publication Data

US 2013/0113650 A1 May 9, 2013

Related U.S. Application Data

(60) Provisional application No. 61/482,377, filed on May 4, 2011.

(51) Int. Cl.
*G01S 13/89* (2006.01)
*G01S 7/40* (2006.01)

(52) U.S. Cl.
USPC ............ 342/27; 342/100; 342/103; 342/159; 342/174; 342/175

(58) Field of Classification Search
USPC ............ 342/27, 89, 100, 102–103, 159, 174, 342/175
See application file for complete search history.

(56) References Cited

U.S. PATENT DOCUMENTS

| | | | | |
|---|---|---|---|---|
| 2003/0122079 A1* | 7/2003 | Pobanz et al. | ............. | 250/336.1 |
| 2003/0128068 A1* | 7/2003 | Behbahani et al. | ........... | 327/552 |
| 2011/0187585 A1* | 8/2011 | Floyd et al. | .................... | 342/179 |
| 2012/0194265 A1* | 8/2012 | Katsube et al. | ............... | 327/554 |
| 2012/0306681 A1* | 12/2012 | Elad et al. | ........................ | 342/27 |
| 2013/0113650 A1* | 5/2013 | Behbahani et al. | ............. | 342/27 |
| 2013/0113657 A1* | 5/2013 | Behbahani et al. | ........... | 342/373 |

* cited by examiner

*Primary Examiner* — John B Sotomayor
(74) *Attorney, Agent, or Firm* — Tran & Associates

(57) ABSTRACT

An imaging receiver includes a low noise amplifier (LNA) module to receive and amplify the radio-frequency (RF) input signal; one or more switches configured to selectively pass RF input to one or more of the power detector circuits; one or more power detector circuits coupled to the switches to generate output voltages proportional to associated powers at their input ports; one or more reference circuits to provide reference signals to the switches; and one or more integrator circuits to integrate the output voltages of the power detector circuits.

25 Claims, 11 Drawing Sheets

METHODS AND APPARATUS FOR SUPPRESSION OF LOW-FREQUENCY NOISE AND DRIFT IN WIRELESS SENSORS OR RECEIVERS

This application claims priority to Provisional Application Ser. No. 61/482,377, filed May 4, 2011, the content of which is incorporated by reference.

BACKGROUND

The present invention relates to systems and methods for suppressing low frequency noise and drift in wireless sensors.

Passive imaging sensors operating in millimeter-wave atmospheric windows can capture images through obstacles such as fog, clouds, smoke and clothing. This unique feature enables several important applications including theft prevention, low-visibility airplane-landing, concealed weapon detection, covert terrestrial and aerial surveillance, highway traffic monitoring and precision targeting. Existing electronics technologies for passive imaging are bulky, expensive and require complicated moving mechanical components to meet performance requirements. There is a clear need for novel solutions that can significantly reduce the size, weight, power dissipation and cost (SWAP-C of passive imaging sensors while improving the performance and image quality. Such light-weight, low-power solutions will lead to a paradigm shift in the state-of-the-art and will enable new non-intrusive products such as hand-held imagers for port security, helmet-mounted imagers for the warfighter and compact imagers mounted on unmanned aerial vehicles (UAVs).

State-of-the-art imagers are currently built using an array of receivers, each an assembly of several discrete compound-semiconductor (III-V) integrated circuits (ICs). In order to generate thousands of image pixels, either thousands of these receivers must be used (prohibitively heavy/expensive) or a smaller array must be scanned sequentially (requiring mechanical scanners). These receivers also require periodic mechanical/electronic switching to remove flicker noise/drift, resulting in additional components and a factor-of-two degradation in imager sensitivity. In order to address these challenges, highly-integrated imaging solutions in silicon technologies are needed. However, the performance of current passive imaging receivers in SiGe/CMOS is far from the acceptable level, due to a combination of (a) inferior transistor noise figure, (b) high insertion loss of Dicke switch, and (c) use of conventional architectures. It is clear that innovative architectures and techniques must be developed to address these issues and hence enable silicon-based receivers to meet the challenging requirements of practical imaging.

SUMMARY

A direct-detection receiver is disclosed with an LNA and a power detector.

In one aspect, an imaging receiver includes a low noise amplifier (LNA) module to receive and amplify the radio-frequency (RF) input signal; one or more power detector circuits coupled to the LNA module to generate output voltages proportional to associated powers at their input ports; one or more switches configured to selectively pass RF input to one or more of the power detector circuits; one or more reference circuits to provide reference signals to the switches; and one or more integrator circuits to integrate the output voltages of the power detector circuits.

In another aspect, a receiver includes an LNA module or circuit whose input is connected to an antenna, and a power detector module comprising two power detector circuits, each with a single input and a single output. The receiver further includes two single-pole double-throw (SPDT) switches. One of the SPDT switch circuits has one of its inputs connected to the output of the LNA module, its other input connected to a reference circuit, and its output connected to one of the inputs of the power detector module. The other SPDT switch has one of its inputs connected to the output of the LNA module, its other input connected to a reference circuit, and its output connected to the other input of the power detector module.

In yet another aspect, a receiver for passive or active imaging includes a low-noise amplifier (LNA) module or circuit to receive and amplify the input signal; a power detector module generating an output voltage proportional to the power at its input; and a circuit. block/module or a technique/mechanism to cancel or reduce the effect of flicker noise and drift in the receiver.

Implementations of the above aspect may include one or more of the following.

The power detector module may include a power detector circuit, which may be realized by using non-linear devices/circuits, including but not limited to, diodes, MOS transistors, bipolar transistors, SiGe hetero-junction bipolar transistors, peak detector circuits and envelope detector circuits. Additional circuitry is electrically connected to the output of the power detector module, and includes zero or more: amplifiers for signal amplification; filters to limit noise; anti-aliasing filters for analog-to-digital converters; clocked integrators; sample-and-hold circuits; and subtractor circuits.

An analog-to-digital convertor (ADC) can convert the output analog voltage signal into digital bits. A digital signal processor (DSP) can process the digital data. A clock generator can produce timing signals and events for the integrator, ADC, and DSP. A digital command interface can be used such as SPI (serial-to-parallel interface).

The receiver is formed completely or partially on one or more integrated circuit chips/substrates, including but not limited to, silicon (CMOS), silicon-germanium (SiGe CMOS/BiCMOS), silicon-on-insulator (SOI CMOS), GaAs, InGaAs, InP, and silicon-on-sapphire. The antenna may be located on the same die, or in the same package as the receiver, or on a printed circuit board (PCB), or in a waveguide. Additional passive and active components may exist in the package, including but not limited to, matching networks, amplifiers, feed lines and multi-throw switches. The signal frequency at the receiver input is anywhere between 2 GHz and 300 GHz, The signal frequency at the receiver input is limited to the imaging/communications bands in the millimeter-wave or EHF (30-300 GHz) spectrum, in particular 20-50 GHz (K/Q) band), 50-70 GHz (V band), 60-90 GHz (E band), 70-110 GHz (W band), 140 GHz (D band) and 220 GHz (G band).

The output of the LNA module is connected to the input of the power detector module, and the receiver includes a single-pole double-throw (SPDT) switch circuit, with a first input connected to the antenna, a second input connected to a reference circuit, a single output connected to the input of the LNA module, and a digital control signal that changes the state of the switch by connecting either the first or the second input to the output; and a subtractor circuit in the additional circuitry following the power detector module. The mechanism for cancellation/reduction the effect of flicker noise and drift in the receiver includes alternately switching the SPDT switch between the two inputs using a clock as the digital control signal;

converting the two input powers (corresponding to the two inputs of the switch) into voltages in the power detector module; and taking the difference of the two voltages in the subtractor circuit, at the end of each cycle of the control signal clock. The reference circuit of the switch can include zero or more resistors, whose values may be fixed, continuously variable or variable in discrete steps; zero or more amplifiers, whose gains may be fixed, continuously variable or variable in discrete steps. The switches can include a plurality of passive and/or active devices, including but not limited to, MOS transistors, SiGe HBT transistors, compound semiconductor transistors, diodes, resistors, capacitors, transmission lines, and inductors. The duty cycle of the digital control clock may be anywhere between 0 and 100 percent, and preferably between 50 and 100 percent.

The input of the LNA module is connected to the antenna, and the power detector module comprises of two power detector circuits, each with a single input and a single output. The receiver can include a first SPDT switch circuit with the first input connected to the output of the LNA module, the second input connected to a reference circuit, the output connected to the first input of the power detector module, and a digital control signal that changes the state of the switch by connecting either the first or the second input to the output; a second SPDT switch circuit with the first input connected to the output of the LNA module, the second input connected to a reference circuit, the output connected to the second input of the power detector module, and a digital control signal that changes the state of the switch by connecting either the first or the second input to the output; a voltage combiner circuit at the two outputs of the power detector module; and a subtractor circuit in the additional circuitry following the power detector module. The mechanism for cancellation/reduction of the effect of flicker noise and drift in the receiver can include alternately switching each of the SPDT switches between its two inputs using a clock as the digital control signal, wherein the digital control signals are formed by two clock signals with complementary phases; converting each of the two input powers into voltage outputs in the power detector module; adding the two voltages at the outputs of the power detector module; sampling the total output voltage at the moments that the control signal clock transitions from one phase to the other; and taking the difference of the sampled voltages in the subtractor circuit, at the end of each cycle of the control signal clock. The reference circuits of the two switches may be independent or shared, and can include zero or more resistors, whose values may be fixed, continuously variable, or variable in discrete steps; zero or more amplifiers, whose gains may be fixed, continuously variable, or variable in discrete steps. The switches may comprise a plurality of passive and/or active devices, including but not limited to, MOS transistors, SiGe HBT transistors, compound semiconductor transistors, diodes, resistors, capacitors, transmission lines, and inductors. The duty cycle of the digital control clock may be anywhere between 0 and 100 percent, and preferably between 50 and 100 percent.

The LNA module can include a first amplifier with its input connected to the antenna; a power splitter, with a single input and two outputs, and with its input connected to the output of the first amplifier; a second amplifier, with its input connected to one of the outputs of the power splitter and its output connected to one of the inputs of the power detector module; and a third amplifier, with its input connected to the other output of the power splitter and its output connected to the other input of the power detector module. The receiver can include a first SPDT switch, connected between an output of the power splitter and the input of the second amplifier, or between the output of the second amplifier and an input of the power detector module, and one of the inputs connected to a reference circuit; and a second SPDT switch connected between the other output of the power splitter and the input of the third amplifier, or between the output of the third amplifier and the other input of the power detector module, and one of the inputs connected to a reference circuit. The mechanism for cancellation/reduction of the effect of flicker noise and drift in the receiver includes alternately switching each of the SPDT switches using a clock as the digital control signal, wherein the digital control signals are formed by two clock signals with complementary phases; converting each of the two input powers into voltage outputs in the power detector module; adding the two voltages at the outputs of the power detector module; sampling the total output voltage at the moments that the control signal clock transitions from one phase to the other; and taking the difference of the sampled voltages in the subtractor circuit, at the end of each cycle of the control signal clock. The reference circuits of the two switches may be independent or shared, and can have zero or more resistors, whose values may be fixed, continuously variable, or variable in discrete steps; zero or more amplifiers, whose gains may be fixed, continuously variable, or variable in discrete steps. The switches may comprise a plurality of passive and/or active devices, including but not limited to, MOS transistors, SiGe HET transistors, compound semiconductor transistors, diodes, resistors, capacitors, transmission lines, and inductors. The duty cycle of the digital control clock may be anywhere between 0 and 100 percent, and preferably between 50 and 100 percent. Alternatively, the power splitter may be replaced by an SPDT switch, with its input connected to the output of the first amplifier, its first output connected to the input of the second amplifier, and its second output connected to the input of the third amplifier. The mechanism for cancellation/reduction of the effect of flicker noise and drift in the receiver can include alternately switching the SPDT switch between its two outputs using a clock as the digital control signal; converting each of the two input powers into voltage outputs in the power detector module;

adding the two voltages at the outputs of the power detector module; sampling the total output voltage at the moments that the control signal clock transitions from one phase to the other; and taking the difference of the sampled voltages in the subtractor circuit, at the end of each cycle of the control signal clock. The switches may have a plurality of passive and/or active devices, including but not limited to, MOS transistors, SiGe HBT transistors, compound semiconductor transistors, diodes, resistors, capacitors, transmission lines, and inductors. The duty cycle of the digital control clock may be anywhere between 0 and 100 percent, and preferably between 50 and 100 percent. As another alternative, the receiver can have a first SPDT switch in the bias circuit path of the second amplifier, with a first input connected to a bias circuitry, a second input connected to ground, and its output connected to the bias terminal of the second amplifier; and a second SPDT switch in the bias circuit path of the third amplifier, with a first input connected to a bias circuitry, a second input connected to ground, and its output connected to the bias terminal of the third amplifier. The mechanism for cancellation/reduction of the effect of flicker noise and drift in the receiver includes alternately switching each of the SPDT switches between its two inputs using a clock as the digital control signal, wherein the digital control signals are formed by two clock signals with complementary phases; converting each of the two input powers into voltage outputs in the power detector module; adding the two voltages at the outputs of the power detector module; sampling the total output voltage at the moments that the control signal clock transitions from one phase to the other; and taking the difference of the sampled voltages in the subtractor circuit, at the end of each cycle of the control signal clock. The switches may comprise a plurality of passive and/or active devices, including but not limited to, MOS transistors, SiGe HBT transistors, compound semiconductor transistors, diodes, resistors, capacitors, transmission lines, and inductors, The duty cycle of the digital control clock may be anywhere between 0 and 100 percent, and preferably between 50 and 100 percent. The reference circuit may be shared between the SPDT switches and may include a voltage-controlled oscillator (VCO); and a level adjustment circuit, with its input connected to the output of the VCO and its output connected to the reference terminals of the switches. The VCO may be realized using a variety of topologies including, but not limited to, a cross-coupled LC VCO, a Colpitts LC VCO and a push-push VCO. The imaging receiver does not require a VCO with an accurate or stable frequency output, and does not require adjustment of the VCO frequency using a phase-locked loop. The level adjustment circuit may be realized using a variety of topologies including, but not limited to: an amplifier with fixed, variable or programmable gain; and an attenuator with fixed, variable or programmable attenuation. The digital clock frequency may be 100 hertz or higher.

In another aspect, a method to improve the temperature sensitivity (or noise equivalent temperature difference) of a passive or active imager includes the use of the above receiver. The power dissipation or the size of a passive or active imager can be reduced by using the receiver.

In another aspect, a method to improve the temperature sensitivity (or noise equivalent temperature difference) of a passive or active imager based on the receiver includes an increase in the clock frequency such that the effect of flicker noise and drift is reduced. The integrator circuit (e.g. switched-capacitor integrator) may also simultaneously perform the function of the subtractor circuit. The integrator may be implemented as an analog circuit preceding the ADC, or in the digital domain following the ADC. The integrator can be implemented within the DSP. A calibration module can calibrate several characteristics of the receiver and its constituents, including but not limited to: the gains of the constituent amplifiers, the values of the constituent resistors, the currents and voltage in the constituent bias circuits, the noise temperature (or noise power) of the reference circuits connected to the switches in the receivers; the frequency of the digital clock; the duty cycle of the digital control clock in the receivers; the accuracy of cancellation/reduction of flicker noise and drift in the receiver; and the power level at the output of the level adjustment circuit, and at the reference terminals of the SPDT switches in the receivers.

In another aspect, an imaging receiver array has a plurality of receivers with their inputs connected to a plurality of antennas, and with each output generating a pixel in the image.

Advantages of the preferred embodiment may include one or more of the following. The sensitivity (NETD) of the direct-detection imaging receiver suffers greatly from the flicker noise (1,/f noise) of the power detector. Traditionally, a Dicke switch has been used at the input of the receiver to mitigate the flicker noise problem, by switching between the antenna and a reference. Although the Dicke switch is very effective in cancelling the flicker noise, it degrades the NETD of the imager from the ideal limit set by the thermal noise in three ways: i) receiver NF degradation due to its insertion loss, ii) signal detection over only 50% of the time; iii) additional noise injection during 50% of the time. The preferred embodiment's Lossless Flicker-noise Cancellation (LFC) approach solves all three challenges, resulting in imager NETD performance approaching the theoretical limit set by thermal noise. In one embodiment of the LFC system, two detectors are fed from a single LNA through two SPDT switches, In one half-cycle, a first detector is connected to the LNA output and a second detector is connected to a low-noise reference. In the other half-cycle, the first detector is connected to the low-noise reference and the second detector is connected to the signal. Therefore: i) absence of a switch at the LNA input preserves its inherent noise figure, ii) the signal is detected 100% of the time, iii) negligible thermal noise is injected when the detector is connected to the low-noise reference, As LFC enables the imaging system to approach the thermal-noise-limited performance, silicon-based solutions will be able to provide acceptable NETDs lower than 0.3K, better than currently available III-V commercial solutions.

DESCRIPTION

Figure 1:
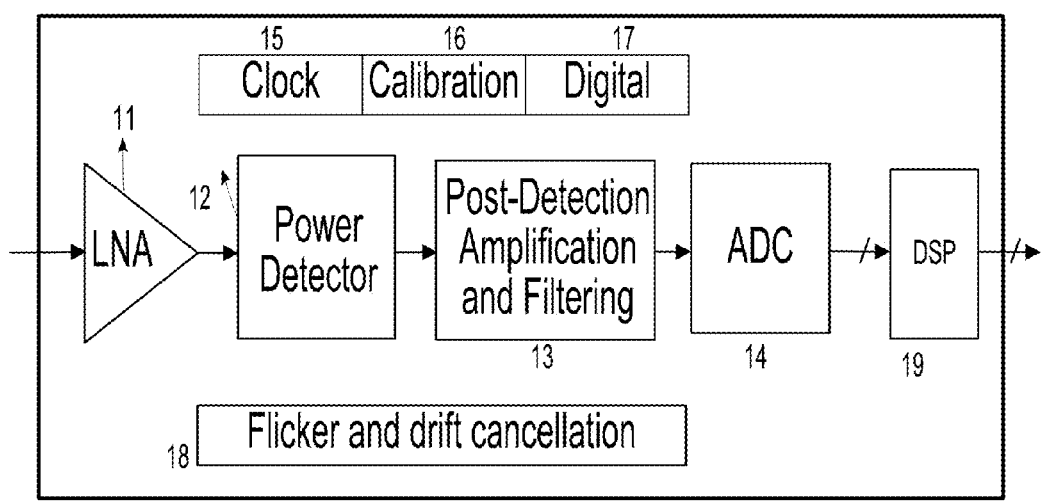
FIG. 1 is a block diagram illustrating an exemplary embodiment of an imaging receiver, in accordance with one aspect of the invention.

FIG. 1 is a block diagram illustrating an exemplary embodiment of an imaging receiver. This embodiment is a highly-integrated receiver for passive or active imaging. As depicted in FIG. 1, the receiver has a low noise amplifier (LNA) module 11 to receive and amplify an input signal, a power detector module 12 to generate an output voltage proportional to the power at its input, and a circuit block/module or a technique/mechanism 18 to cancel or reduce the effect of flicker noise and drift in the receiver. Clock 15, calibration circuit 116 and digital support block 17 are also included in the receiver. The imaging receiver also includes a post-detection amplification and filtering block 13, and analog to digital converter (ADC) 14, and a digital signal processor (DSP) 19.

Figure 2:
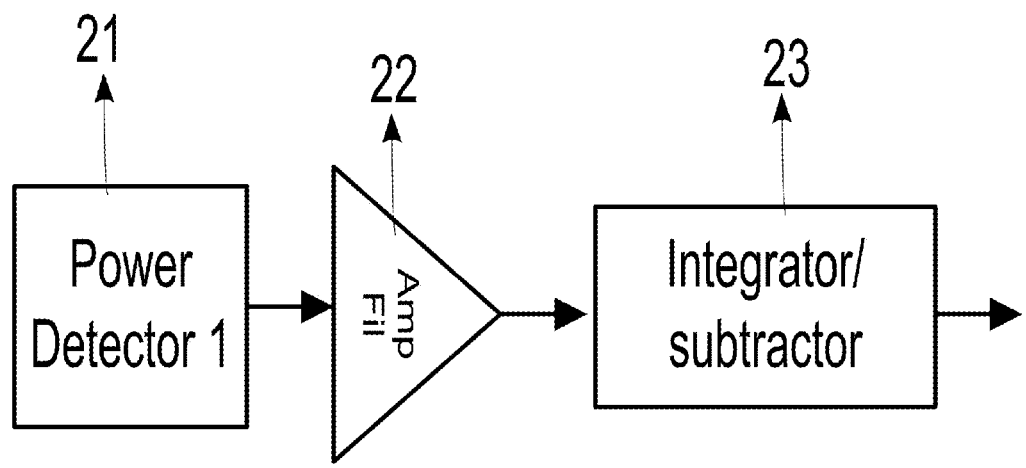
FIG. 2 is a block diagram illustrating an exemplary embodiment of the circuitry following the LNA module, in accordance with another aspect of the invention.

FIG. 2 is a block diagram illustrating an exemplary embodiment of the circuitry following the LNA module, in accordance with the preferred embodiment. The power detector module 12 can include a power detector circuit 21, which may be realized by using non-linear devices/circuits, including but not limited to, diodes, MOS transistors, bipolar transistors, SiGe hetero-junction bipolar transistors, peak detector circuits and envelope detector circuits. Furthermore, as shown in FIG. 2, additional circuitry may be electrically connected to the output of the power detector module, including but not limited to, amplifiers 22 for signal amplification, filters to limit noise, anti-aliasing filters for analog-to-digital converters, clocked integrators, sample-and-hold circuits, and integrator or subtractor 23.

Figure 3:
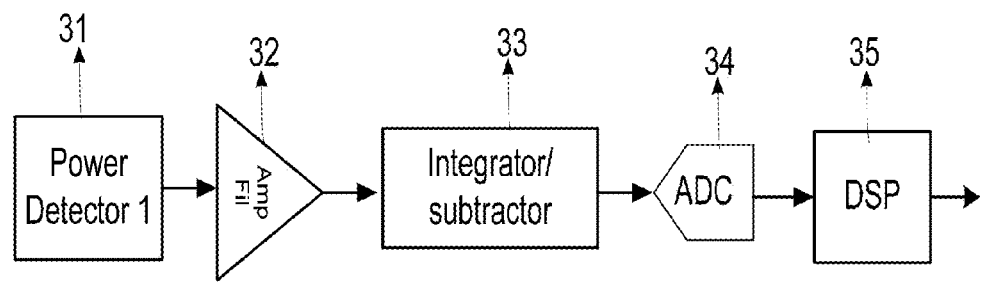
FIG. 3 shows a block diagram illustrating another exemplary embodiment of the circuitry following the LNA module, in accordance with yet another aspect of the invention.
Figure 4:
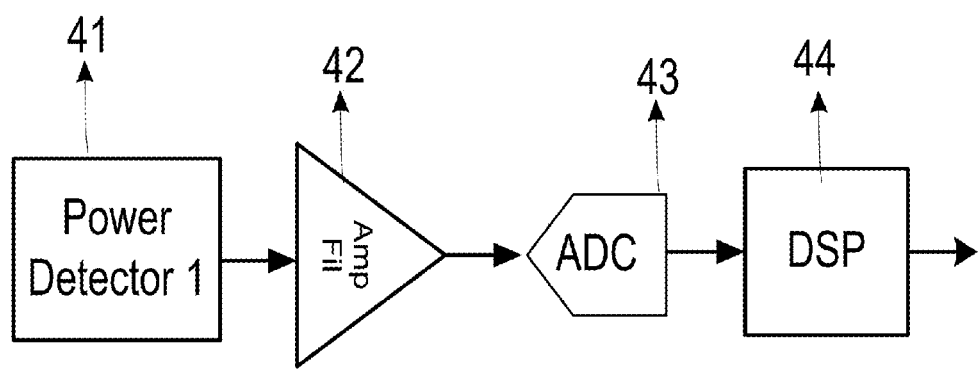
FIG. 4 shows a block diagram illustrating yet another exemplary embodiment of the circuitry following the LNA module, in accordance with another aspect of the invention.

FIG. 3 shows a block diagram illustrating another exemplary embodiment of the circuitry following the LNA module 11, in accordance with the preferred embodiment, while FIG. 4 shows a block diagram illustrating yet another exemplary embodiment of the circuitry following the LNA module 11. In FIG. 3, a power detector 31 drives an amplifier 32 whose output is provided to a integrator/subtractor 33. The output of the integrator/subtractor 33 is sampled by an ADC 34 and then processed by the DSP 35. Correspondingly, in FIG. 4, a power detector 41 drives an amplifier 42 whose output is provided to an ADC 43 and then processed by the DSP 44.

The aforementioned receiver can be used in electronic systems for various applications at frequencies ranging from 2 GHz to 300 GHz. It is highly suitable for use at millimeter-wave (mm-wave) frequencies, especially to realize active/passive imaging systems in the extremely high frequency (EHF) spectrum from 30-300 GHz including 20-30 GHz. (K band), 50-70 GHz (V band), 60-90 GHz (E band); 70-110 GHz (W band), 140 GHz (D band) and 220 GHz (G band), Exemplary embodiments of the receiver will be described shortly.

The receiver can be formed completely or partially on one or more integrated circuit chips/substrates, including but not limited to, silicon (CMOS), silicon-germanium (SiGe CMOS/BiCMOS), silicon-on-insulator (SOI CMOS), GaAs, InGaAs, INP, and silicon-on-sapphire. Implementation on a silicon substrate is desirable since it can provide the highest level of integration.

The receiver may further include an analog-to-digital convertor (ADC) to convert the output analog voltage signal into digital bits, as shown in FIG. 3. A digital signal processor (DSP) may be used to process the digital data (FIG, 3). The integrator may be implemented as an analog circuit preceding the ADC (FIG. 3), or in the digital domain in the DSP following the ADC (FIG. 4). The receiver may also have a clock generator to produce timing signals and events for the integrator, ADC, DSP and other circuitry in the receiver. A digital command interface, such as an SPI (serial-to-parallel interface) may be used to program the digital circuits in the receiver.

Figure 5:
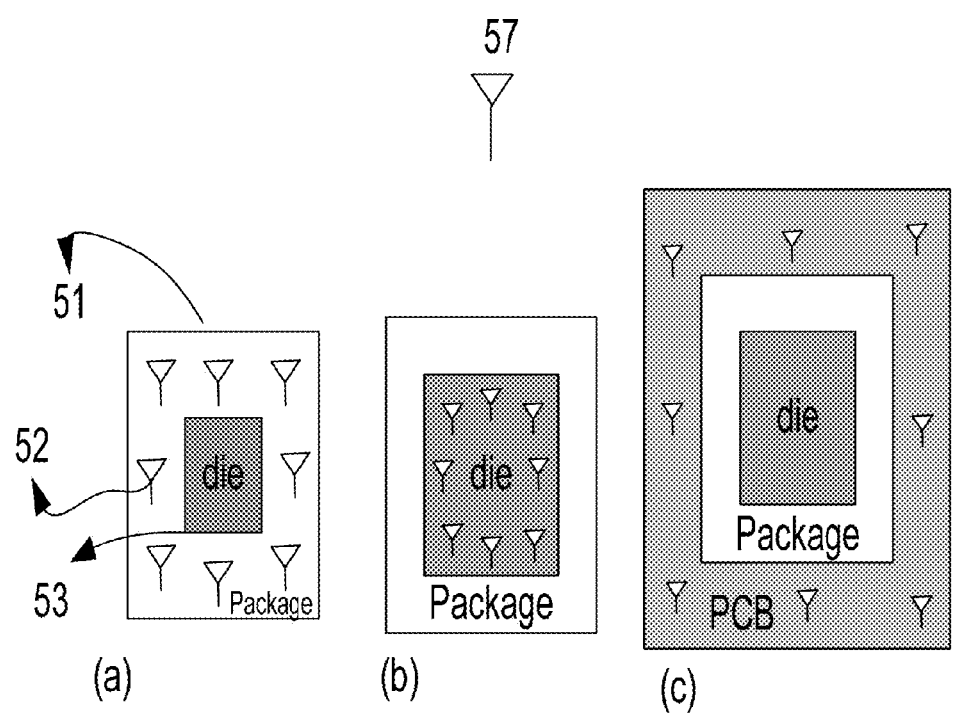
FIG. 5 shows schematics illustrating several exemplary embodiments of the physical arrangement of the semiconductor die and antennas in the package and the PCB, in accordance with an aspect of the invention.

FIG. 5 shows several exemplary embodiments of the physical arrangement of an integrated receiver, in accordance with the preferred embodiment. An antenna Si may be integrated in the same package as die 53 in an integrated circuit chip 51, or on the printed circuit board on which the packaged chip is attached. In another embodiment, the antenna 51 may be integrated within the integrated circuit chip. The antenna may also be formed in standard waveguides such as WR15, WR12, WR10, etc. The receiver may further include additional passive and active components in the package, including but not limited to, matching networks, amplifiers, feed lines and multi-throw switches.

The thermal sensitivity performance of the imager, as quantified by the noise-equivalent temperature difference (NETD), can be significantly degraded due to losses in front of the chip, especially for a silicon chip since the receiver noise figure is typically higher than III-V implementations. Therefore, pre-receiver losses must be minimized. Typically, the RF pads of the receiver are bonded to a high-frequency substrate (alumina/ceramic, quartz, Rogers) using ribbon bonds. The substrate may contain a feed tine to the transition to a waveguide flange or a horn antenna. For silicon implementations, the ribbon-bond lengths must be minimized to minimize the loss. Alternatively, a flip-chip implementation can be used to further reduce the pre-receiver loss, since flip-chip bumps can be shorter than 100 um and have well-defined and repeatable characteristics. The receiver chip with flip-chip bumps on the pads is attached to a high-frequency substrate with bumps corresponding to the bumps on the chip. The RF bumps are then connected to a waveguide flange or a antenna transition through a transmission feed line on the same substrate. The feed line may have additional features such as stubs to tune the frequency response of the receiver module. The lower frequency analog and digital signals to or from the flip-chip assembly can be routed either to a multi-pin connector on the same substrate or to a low-frequency substrate (FR4, BT) through wirebonds. The entire assembly can be enclosed in a metal housing or on a waveguide split-block module. This packaging method is especially suitable for receivers operating in the EHF spectrum of 30-300 GHz.

Figure 6:
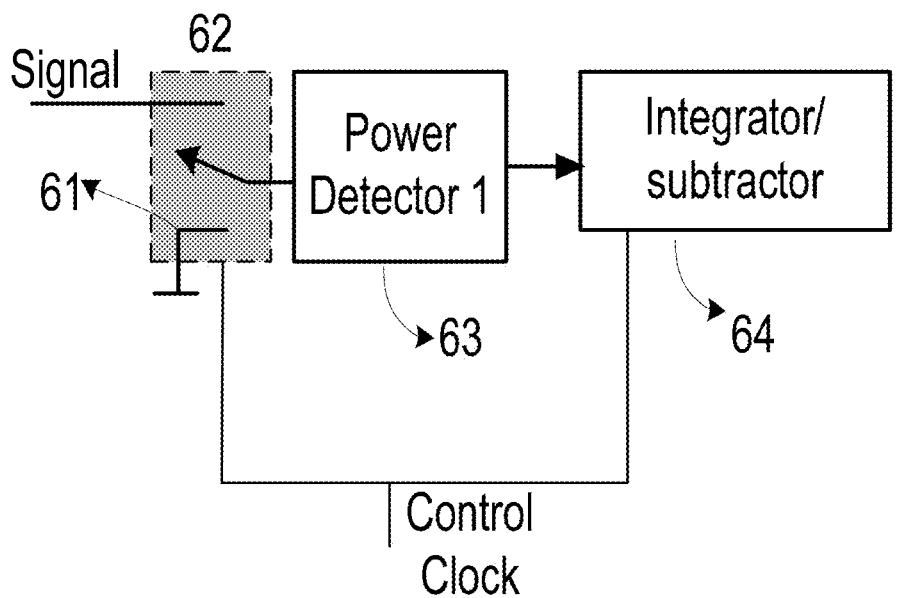
FIG. 6 shows a block diagram illustrating an exemplary embodiment of an imaging receiver including a. flicker noise cancellation/reduction technique, and representative waveforms of the control signal and the output voltage, in accordance with one aspect of the invention.
Figure 6:
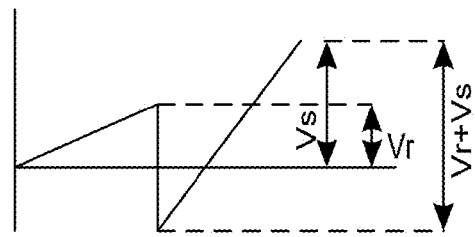
Figure 6:
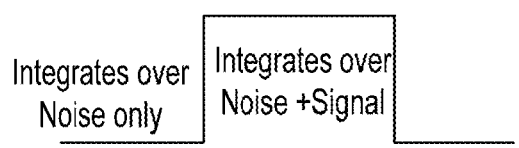

FIG. 6 shows a block diagram illustrating an exemplary embodiment of an imaging receiver including a flicker noise cancellation/reduction technique, and representative waveforms of the control signal and the output voltage, in accordance with the preferred embodiment. In FIG. 6, the output of the LNA module is connected to the input of a power detector module 63. A single-pole double-throw (SPDT) switch circuit is inserted preceding the LNA. Input 62 is connected to the antenna, the other input 61 is connected to a reference circuit and its single output is connected to the input of the LNA module. The reference circuit of the switch may include resistors, whose value may be fixed, continuously variable or variable in discrete steps, and amplifiers, whose gain may be fixed, continuously variable or variable in discrete steps. A digital control signal is provided that can change the state of the switch by connecting one of the two inputs to the output. In this embodiment, a subtractor circuit 64 is included in the circuitry following the power detector module 63. Furthermore, the receiver includes a mechanism for cancellation/reduction of the effect of flicker noise and drift in the receiver on the thermal sensitivity. In this mechanism, the SPDT switch is alternately switched between the two inputs using a clock as die digital control signal. The power detector module then converts the two input powers (corresponding to the two inputs of the switch) into proportional voltages at its output. After integration, the difference of the two voltages is computed by the subtractor circuit, at the end of each cycle of the control signal clock.

Figure 7:
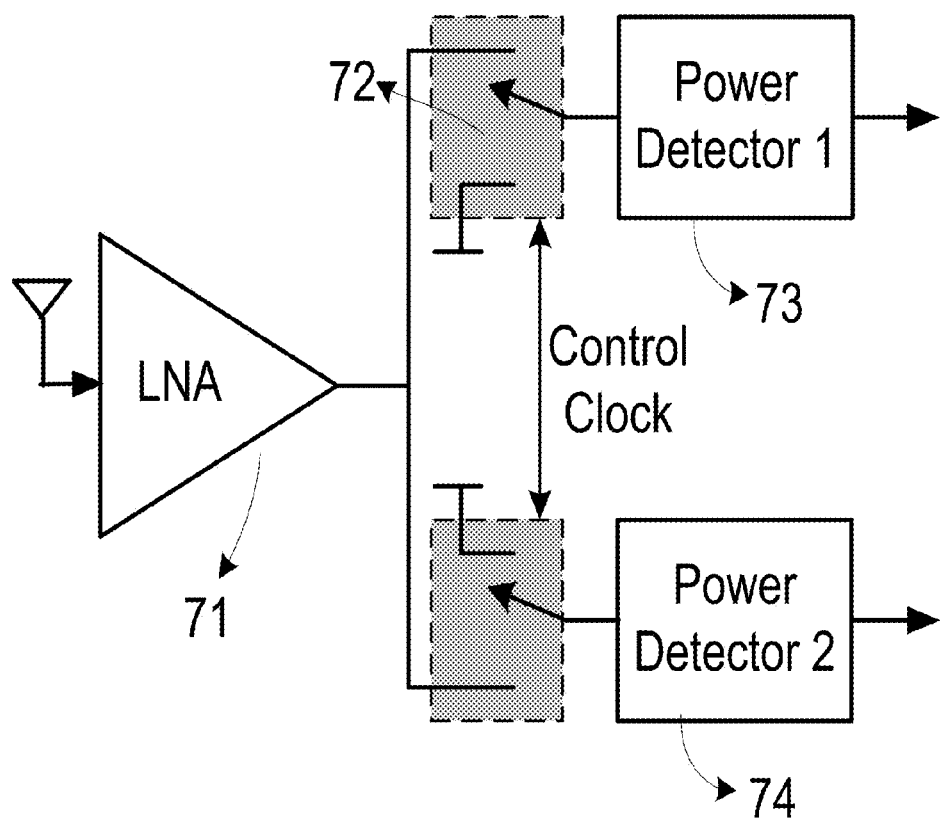
FIG. 7 shows a block diagram illustrating another exemplary embodiment of an imaging receiver including a flicker noise cancellation/reduction technique, in accordance with another aspect of the invention.

FIG. 7 shows a block diagram illustrating another exemplary embodiment of an imaging receiver including a flicker noise cancellation/reduction technique, in accordance with the preferred embodiment. In this embodiment, a Lossless Flicker-noise Cancellation (LFC) circuit solves three challenges that plagued conventional systems, including: i) NF degradation due to its insertion loss; ii) signal detection over only 50% of the time; iii) additional noise injection during 50% of the time. The resulting imager NETD performance approaches the theoretical limit set by thermal noise.

Turning now to FIG. 7, two detectors 73-74 are fed from a single LNA 71 through two SPDT switches 72 that are commonly clock controlled. In one half-cycle, detector 73 is connected to the LNA output and detector 74 is connected to a low-noise reference. In the other half-cycle, detector 73 is connected to the low-noise reference and detector 74 is connected to the signal. Therefore: i) absence of a switch at the LNA input preserves its inherent noise figure, ii) the signal is detected 100% of the time, iii) negligible thermal noise injected when the detector is connected to the low-noise reference.

The LFC enables the imaging system to approach the thermal-noise-limited performance. Thus, silicon-based solutions will be able to provide acceptable NETDs of—lower than 0.3K, which is better than currently available commercial solutions.

The reference circuits of the two switches may be independent or shared, and may include resistors, whose value may be fixed, continuously variable or variable in discrete steps, and amplifiers, whose gain may be fixed, continuously variable or variable in discrete steps. Digital control signals are provided that change the states of the switches by connecting one of their inputs to the output. The receiver also includes a circuit to combine the voltages at the two outputs of the power detector module, and a subtractor circuit in the additional circuitry following the power detector module.

Preferably, the receiver includes a mechanism for cancellation/reduction of the effect of flicker noise and drift in the receiver on the thermal sensitivity. In this embodiment, each of the SPDT switches is alternately switched between its two inputs using a clock as the digital control signal. The digital control signals for the two switches are formed by two clock signals with complementary phases, such that, at a given time, the output of the LNA module is connected to only one of the inputs of the power detector module. The power detector module then converts each of the two input powers into proportional voltages at its outputs. A circuit adds these two voltages at the outputs of the power detector module. After integration, the total output voltage is sampled at the instant when the control signal clock transitions from one phase to the other. A subtractor circuit then computes the difference of the sampled voltages, at the end of each cycle of the control signal clock.

Figure 8:
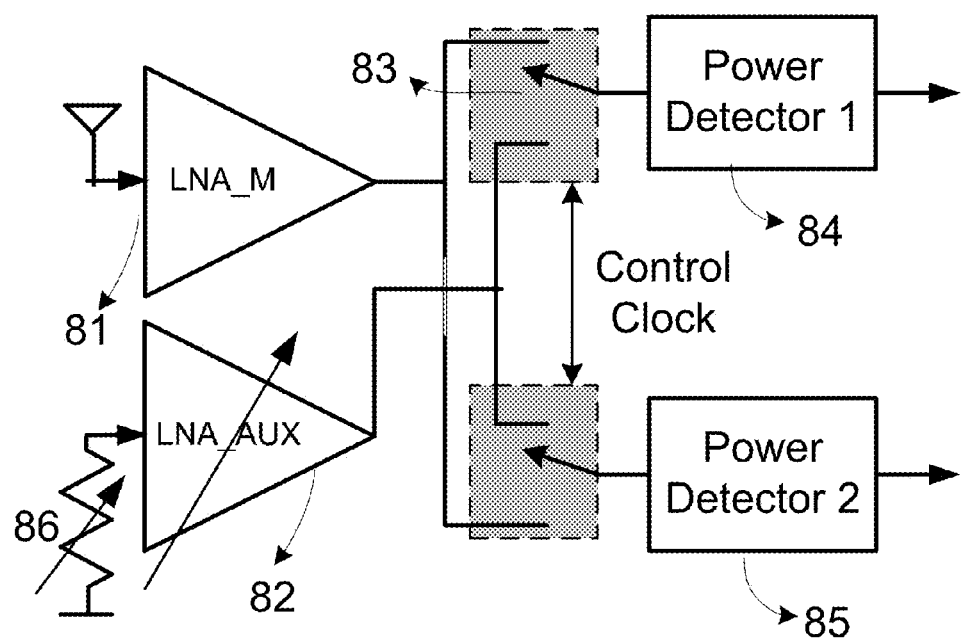
FIG. 8 shows a block diagram illustrating yet another exemplary embodiment of an imaging receiver including a flicker noise cancellation/reduction technique, in accordance with yet another aspect of the invention.

FIG. 8 shows a block diagram illustrating yet another exemplary embodiment of an imaging receiver including a flicker noise cancellation/reduction technique. In FIG. 8, the input of an LNA module 81 is connected to the antenna, and the power detector module comprises of two power detector circuits 84 and 85, each with a single input and single output. The receiver further includes two SPDT switches collectively numbered as 83. One of the SPDT switches circuit has one of its inputs connected to the output of the LNA module, its other input connected to a reference circuit, in this case an auxiliary LNA 82 with a variable resistor 86, and the auxiliary LNA output is connected to one of the inputs of the power detector module. The other SPDT switch has one of its inputs connected to the output of the LNA module, its other input connected to the auxiliary LNA, and its output connected to the other input of the power detector module.

In the receiver in the preferred embodiment and its exemplary embodiments described herein, the switches may be a plurality of passive and/or active devices, including but not limited to, MOS transistors, SiGe HBT transistors, compound semiconductor transistors, diodes, resistors, capacitors, transmission lines, and inductors. Furthermore, the duty cycle of the digital control clock may be anywhere between 0 and 100 percent, and preferably between 50 and 100 percent. The digital clock frequency may be 100 hertz or higher.

Using the methods and principles described herein, the temperature sensitivity (or noise equivalent temperature difference) of a passive or active imager can be significantly improved. This is a direct consequence of avoiding switches in the signal path, and techniques to cancel/reduce the effects of flicker noise and drift in the receiver, Furthermore, the power dissipation and size of a passive or active imager using the receiver in the preferred embodiment can be significantly lower than the existing prior art. This is a result of high level of integration and lower losses in the signal path.

In the embodiments of the preferred embodiment described herein, the temperature sensitivity (or noise equivalent temperature difference) of a passive or active imager can be improved further by increasing the clock frequency, which reduces the effect of flicker noise and drift.

In an exemplary embodiment, the integrator circuit (e.g. switched-capacitor integrator) may also simultaneously perform the function of the subtractor circuit.

In another exemplary embodiment of the receiver, the receiver may further have a calibration module to calibrate several characteristics of the receiver and its constituents, including but not limited to:
   a. the gains of the constituent amplifiers,
   b. the values of the constituent resistors,
   c. the currents and voltage in the constituent bias circuits,
   d. the noise temperature (or noise power) of the reference circuits connected to e switches in the receiver,
   e. the frequency of the digital clock,
   f. the duty cycle of the digital control clock in the receiver, and
   g. the accuracy of cancellation/reduction of flicker noise and drift in the receiver.

For example, in the exemplary embodiments described herein and shown in FIGS. 6, 7 and 8, the power at the input of the power detector module may change significantly when the SPDT switch (or switches) changes from one state to the other. Since the flicker noise of the detector is typically a function of the input power, this may result in imperfect cancellation of the flicker noise and hence degraded sensitivity. This problem can be solved by calibration, an example of which is shown in FIG. 8. The reference terminals of the SPDT switches are connected to a variable gain amplifier with a variable input termination resistor. By varying the resistor and/or amplifier gain, the variation in the power at the input of the power detector module in different switch states can be reduced, leading to it proved cancellation of flicker noise and drift and to improved sensitivity.

Figure 9:
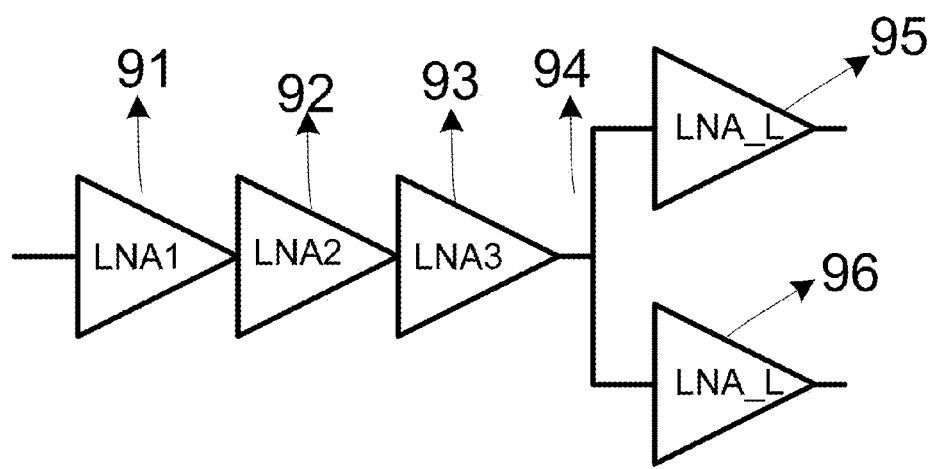
FIG. 9 shows a block diagram illustrating an exemplary embodiment of the LNA module, in accordance with an aspect of the invention.

FIG. 9 shows a block diagram illustrating an exemplary embodiment of the LNA module. Instead of connecting the output of the LNA module in FIG. 7 directly to the inputs of the two SPDT switches, the INA module may be modified to have two outputs. As shown in FIG. 9, the LNA module includes a power splitter with an amplifier connected to each of the two outputs of the power splitter. The output of each amplifier is connected to the input of one of the SPDT switches in FIG. 7. In another embodiment, the SPDT switches may be placed at the inputs of the two amplifiers, in which case the output of each of the amplifiers is directly connected to an input of the power detector module. In another embodiment, the power splitter may be replaced by an SPDT switch, with its input connected to the output of the amplifier 93, its outputs connected to the inputs of the amplifier 95 and 96. In yet another embodiment, the SPDT switches can be eliminated from the signal path, and placed instead in the bias paths of the amplifiers 95 and 96.

Figure 10:
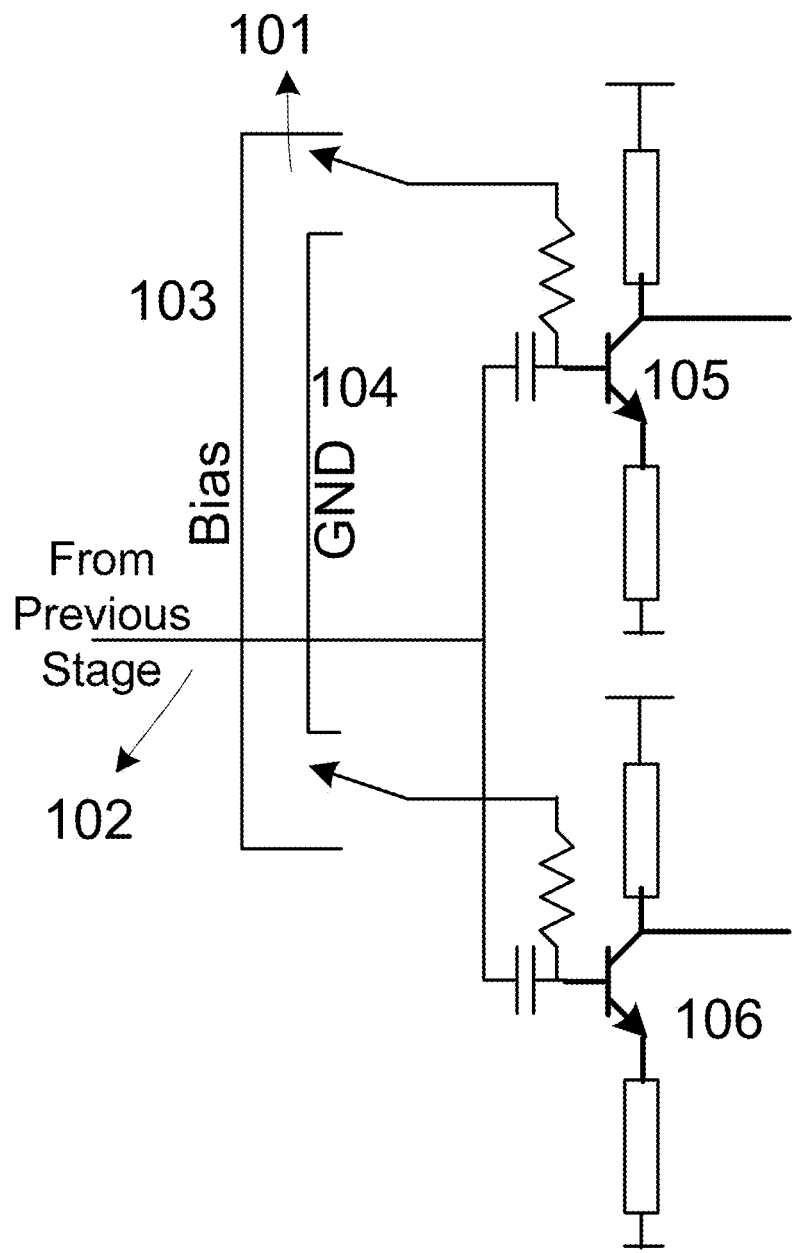
FIG. 10 shows a schematic illustrating an exemplary embodiment of part of the LNA module, enabling a flicker noise cancellation/reduction technique, in accordance with another aspect of the invention.

Another exemplary embodiment is shown in FIG. 10, where each SPDT switch can connect the bias terminal of the amplifier to either the bias circuitry or to the ground terminal. Using complementary clock phases to drive the two SPDT switches, only one of the amplifiers 105 and 106 is turned on at a time. This method realizes the same function as the other embodiments describes hereto, but with a significant improvement in the sensitivity performance, since the switch losses do not appear in the signal path and do not degrade the receiver noise.

Figure 11:
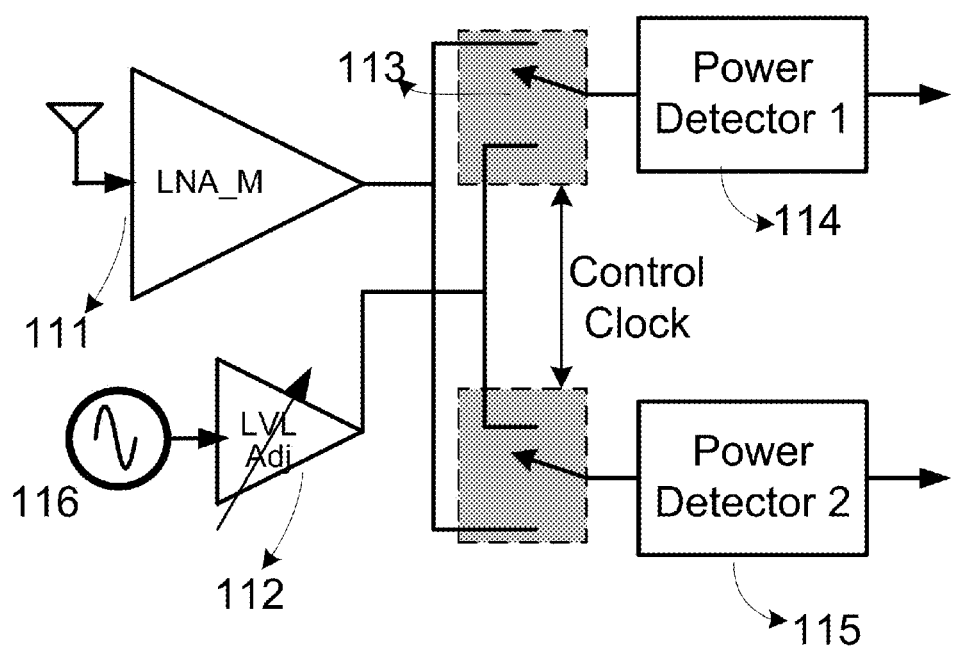
FIG. 11 shows a block diagram illustrating another exemplary embodiment of an imaging receiver including a flicker noise cancellation/reduction technique, in accordance with a further aspect of the invention.

Another example of flicker-noise calibration is shown in FIG. 11. The block diagram of FIG. 11 illustrates an exemplary embodiment of an imaging receiver including a flicker noise cancellation/reduction technique. FIG. 11 includes an 111 and SPDT switches 113. The reference terminals of the SPDT switches 113 are connected together to a reference circuit consisting of a voltage-controlled oscillator (VCO) 116 and a level adjustment circuit 112, The VCO output 116 is connected to the input of the level adjustment circuit 112, whose output is connected to the reference terminals of the switches 113. The VCO can be realized as one of many topologies including, but not limited to, across-coupled LC VCO, a Colpitts VCO, and a push-push LC VCO. The level adjustment circuit can be realized using a vane of topologies including, but not limited to, an amplifier with fixed, variable or programmable gain and an attenuator with fixed, variable or programmable attenuation. By varying the gain or attenuation in the level adjustment circuit, the variation in the power at the input of the power detector module in different switch states can be reduced, leading to improved cancellation of flicker noise and drift and to improved sensitivity. The VCO does not need to have an accurate or stable frequency output, and a phase-locked loop to adjust the frequency at the VCO output is not required. Advantages of this calibration technique over that in FIG. 8 include lower power and superior noise performance since the noise in the narrowband signal at the VCO output will not be aliased and increased due to low-frequency switching of the digital clock signal.

In another exemplary embodiment of the preferred embodiment, an imaging receiver array can be realized using an array of receivers described earlier, with their inputs connected to an antenna array, and with each output generating a pixel in the image.

It should be noted that the components of above described architectures may be implemented on the same semiconductor process/substrate or on different semiconductor processes/substrates. In particular, all or some of the system components may be implemented in silicon CMOS processes, SiGe processes and/or (compound semiconductor) processes.

Furthermore, the components of the above mentioned systems may be implemented on one semiconductor die or on multiple dice. In a highly integrated solution, the die may include:
 a. low-noise amplifiers.
 b. in addition to (a), the integrated die may also include a power detector.
 c. The integrated die may also include additional amplifiers, filters, and integrators.
 d. In additions to the above mentioned blocks, the integrated die may also include analog to digital convertors to provide the digital output, and/or a digital processor.
 e. In addition to the above mentioned blocks, the integrated die may also include supporting circuits and functions such as bias, clock generator, serial or parallel digital control blocks, RF, analog, or digital IO's.

Some of the blocks, dice, and components of the system described herein may be integrated in a single chip/die package. For example:
 a. The single chip/die package may include a die/chip with the receiver.
 b. The single chip/die package may include additional amplifiers before the die/chip with the receiver.
 c. The single chip/die package may also include antennas.
 d. The single chip/die package may also include matching structures and components.

The foregoing describes several methods to detect wireless signals or thermal noise for various applications, including wireless communication and active/passive imaging. Several architectures and implementations are also described in accordance with the preferred embodiment. These serve as exemplary embodiments of the invention; one with average skill in the art wilt recognize that other variations on the usage of the principles presented herein can be easily derived, and are within the scope of this invention.

What is claimed is:
1. An imaging receiver, comprising:
 a low noise amplifier (LNA) module to receive and amplify the radio-frequency (RF) input signal;
 one or more switches configured to selectively pass RF input to one or more of the power detector circuits;
 one or more power detector circuits coupled to the switches to generate output voltages proportional to associated powers at their input ports;
 one or more reference circuits to provide reference signals to the switches; and
 one or more integrator circuits to integrate the output voltages of the power detector circuits.

2. The receiver of claim 1, further comprising a clock generator to produce timing signals and events for the switch (es) and integrator circuits.

3. The imaging receiver of claim 2, wherein the switches comprise single-pole double-throw (SPDT) switches.

4. The receiver of claim 3, comprising a circuit for cancellation or reduction of flicker noise and drift to improve thermal sensitivity.

5. The receiver of claim 3, wherein each SPDT switch is alternately switched between two states using a clock as a digital control signal.

6. The imaging receiver of claim 3, wherein:
a first input of a first SPDT switch is coupled to the output of the LNA module, a second input connected to an output of a reference circuit, the output connected to the input of a first power detector circuit;
a first input of a second SPDT switch is connected to the output of the LNA module, the second input connected to an output of a reference circuit, the output connected to the input of a second power detector circuit;
during a first phase of a control clock, the first input of the first SPDT switch is connected to the output of the first SPDT switch, and the second input of the second switch is connected to the output of the second SPDT switch; and
during a second phase of the control clock, the second input of the first SPDT switch is connected to the output of the first SPDT switch, and the first input of the second switch is connected to the output of the second SPDT switch.

7. The imaging receiver of claim 3, further comprising:
a power splitter having an input and two outputs, with the input connected to the output of the LNA module;
a first amplifier with an input connected to a first output of the power splitter; and
a second amplifier with an input connected to a second output of the power splitter.

8. The imaging receiver of claim 7, further comprising:
a first SPDT switch in a bias circuit path of the first amplifier, with a first input connected to a first voltage level, a second input connected to a second voltage level, and an output connected to a bias terminal of the first amplifier;
a second SPDT switch in a bias circuit path of the second amplifier, with a first input connected to a first voltage level, a second input connected to a second voltage level, and an output connected to a bias terminal of the second amplifier;
during a first phase of a control clock, the first input of the first SPDT switch is connected to the output of the first SPDT switch, and the second input of the second SPDT switch is connected to the output of the second SPDT switch; and
during a second phase of the control clock, the second input of the first SPDT switch is connected to the output of the first SPDT switch, and the first input of the second SPDT switch is connected to the output of the second SPDT switch.

9. The imaging receiver of claim 3, further comprising:
an SPDT switch, with its input connected to the output of the LNA module, a first output connected to the input of a first amplifier, and a second output connected to the input of a second amplifier;
a first amplifier with its input connected to the first output of the SPDT switch, and its output connected to the input of a first power detector circuit;
a second amplifier with its input connected to the second output of the SPDT switch, and its output connected to the input of a second power detector circuit;
during a first phase of a control clock, the input of the SPDT switch is connected to the first output of the SPDT switch; and
during a second phase of the control clock, the input of the SPDT switch is connected to the second output of the SPDT switch.

10. The imaging receiver of claim 3, further comprising:
a voltage combiner circuit coupled to the two power detector circuit outputs; and
a subtractor circuit following the power detector circuits.

11. The imaging receiver of claim 3, wherein the SPDT switches comprise current-steering switches.

12. The imaging receiver of claim 1, wherein the reference circuits comprise resistors, whose value are fixed, continuously variable, or variable in discrete steps.

13. The imaging receiver of claim 12, wherein the reference circuits further comprise one or more amplifiers, whose gain may be fixed, continuously variable, or variable in discrete steps.

14. The imaging receiver of claim 1, wherein the reference circuit includes an amplifier identical to the LNA module.

15. The imaging receiver of claim 1, wherein the reference circuit is shared between the switches and comprises:
an oscillator; and
a level adjustment circuit connected to an output of the oscillator and configured to adjust a level of a reference signal, wherein the level adjustment circuit includes a combination of active and passive components.

16. The receiver of claim 1, wherein the integrator circuit simultaneously performs a function of a subtractor circuit, 17. The receiver of claim 1, further comprising:
one or more baseband amplifiers;
an anti-aliasing filter;
a sample-and-hold circuit; and
an accumulator circuit.

18. The receiver of claim 1, further comprising an analog-to-digital converter (ADC) to convert the output analog voltage signal into digital bits.

19. The receiver of claim 1, wherein the receiver is formed completely or partially on one or more integrated circuit chips.

20. The receiver of claim 1, wherein the receiver is mounted on a high-frequency substrate through flip-chip technology, said high-frequency substrate comprising:
a. a feed line connected to the RF input of the receiver; and
b. a transition from the feed line to a waveguide flange.

21. The receiver of claim 1, further comprising a calibration module to calibrate several characteristics of the receiver selected from the group consisting of: gains of constituent amplifiers, the values of constituent resistors, currents and voltage in constituent bias circuits, noise temperature (or noise power) of the reference circuit, a digital clock frequency, a duty cycle of a digital control clock in the receiver, and accuracy of cancellation/reduction of flicker noise and drift in the receiver.

22. An imaging receiver array, comprising a plurality of receivers of claim 1, with inputs connected to a plurality of antennas, and with each output generating a pixel in the image.

23. A method for imaging using a receiver on an integrated circuit chip, comprising:
amplifying a radio-frequency (RF) signal at a receiver input, by passing the signal through a low noise amplifier (LNA) module;
generating a reference signal;
generating an output representative of the power of the RF signal, during a first phase of a control clock, and of the reference signal, during a second phase of the control clock; and
generating another output representative of the power of the reference signal, during the first phase of the control clock, and of the RF' signal, during the second phase of the control clock.

24. The method of claim 23, further comprising;
  integrating a difference between output voltages of the two outputs during a clock cycle; and
  sampling the result of the integration at the instants the control clock transitions from one phase to the other.

25. The method of claim 23, further comprising calibrating the receiver by adjusting a power level of the reference signal.

\* \* \* \* \*